US008015046B2

(12) United States Patent     (10) Patent No.: US 8,015,046 B2
Hagmann et al.     (45) Date of Patent: Sep. 6, 2011

(54) DYNAMIC REPRESENTATIONS OF PROCESSES

(75) Inventors: Thomas Hagmann, Wiesloch (DE); Robert Lang, Wiesloch (DE); Christian Behre, Heidelberg (DE); Martine Clemot, Stutensee (DE)

(73) Assignee: SAP Aktiengesellschaft, Walldorf (DE)

( * ) Notice: Subject to any disclaimer, the term of this patent is extended or adjusted under 35 U.S.C. 154(b) by 2721 days.

(21) Appl. No.: 10/159,797

(22) Filed: May 31, 2002

(65) Prior Publication Data

US 2003/0222896 A1    Dec. 4, 2003

(51) Int. Cl.
 *G06Q 10/00* (2006.01)
(52) U.S. Cl. ........................ 705/7.13; 705/7.14; 705/7.15
(58) Field of Classification Search ................. 705/1, 6, 705/7, 8, 9, 26, 7.13, 7.14, 7.15, 7.16, 7.17, 705/7.18, 7.22, 7.23, 7.24; 364/468.05, 468.06; 345/348
See application file for complete search history.

(56) References Cited

U.S. PATENT DOCUMENTS

| | | | | |
|---|---|---|---|---|
| 5,537,524 | A * | 7/1996 | Aprile | 345/440 |
| 5,661,918 | A * | 9/1997 | Malcolm et al. | 40/107 |
| 5,890,131 | A | 3/1999 | Ebert et al. | |
| 5,907,490 | A * | 5/1999 | Oliver | 700/90 |
| 6,023,702 | A * | 2/2000 | Leisten et al. | 707/100 |
| 6,097,390 | A * | 8/2000 | Marks | 715/772 |
| 6,282,514 | B1 * | 8/2001 | Kumashiro | 705/7 |
| 6,397,202 | B1 * | 5/2002 | Higgins et al. | 706/47 |
| 6,854,088 | B2 * | 2/2005 | Massengale et al. | 715/764 |
| 2001/0032155 | A1 * | 10/2001 | Groat et al. | 705/35 |
| 2003/0135481 | A1 | 7/2003 | Helmes et al. | |
| 2003/0137541 | A1 * | 7/2003 | Massengale et al. | 345/764 |
| 2005/0197999 | A1 | 9/2005 | Kumar | |

FOREIGN PATENT DOCUMENTS

| | | |
|---|---|---|
| JP | 4-141767 | * 5/1992 |
| WO | WO 95/24114 | 9/1995 |
| WO | WO 95/30203 | * 11/1995 |
| WO | 01/59582 | 8/2001 |

OTHER PUBLICATIONS

Kilponen, P., "ViCA—A WWW . . . project Status", Proceedings of 33 Hawaii ICSS, 2000, pp. 1-7.*
"Progress of Literacy in Various Countries", UNESCO, 1953, pp. 1-224.*
Jenskins, T. "CBM, Charting, Progress Monitoring . . . a RTI Model", pp. 1-35.*
"Interactive graphical user interface for PERT/CPM project tracking," IBM Technical Disclosure Bulletin, IBM Corp. New York, US, vol. 33, No. 11, pp. 274-275, Apr. 1991.
Kilponen et al., "ViCA—A WWW based tool for visualizing project status," Proceedings of the 33$^{rd}$ Hawaii International Conference on System Sciences, pp. 1-7, Jan. 4, 2000.

* cited by examiner

*Primary Examiner* — Dean T Nguyen
(74) *Attorney, Agent, or Firm* — Fish & Richardson P.C.

(57) ABSTRACT

A computer-based method for representing a project includes accessing a description of the project, generating a graphic display of at least a portion of the project based on the description, and dynamically updating the graphic display in response to a change in the description of the project. A computer program product for representing a project includes instructions that cause a processor to convert a description of the project into display instructions for displaying relative progress of the project relative to, but independently of, an expectation of progress and displaying a relative rate of progress of the project relative to, but independently of, an expectation of a rate of progress. The computer program product is tangibly stored on machine readable media.

19 Claims, 6 Drawing Sheets

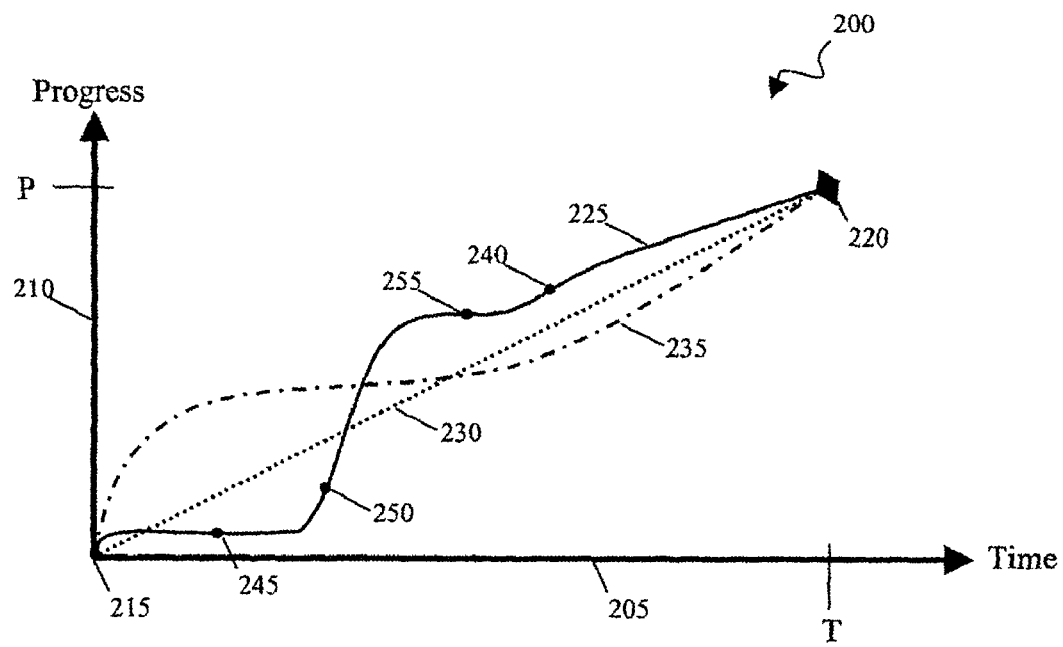
FIG. 2
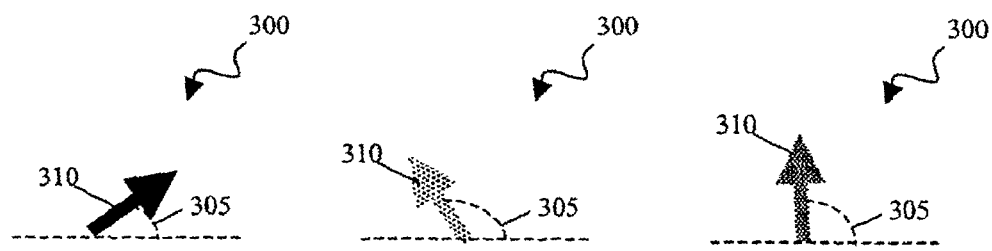
FIG. 3   FIG. 4   FIG. 5

DYNAMIC REPRESENTATIONS OF PROCESSES

BACKGROUND

This invention relates to project and process development.

Project development systems allow a user to, e.g., develop and manage a project. These systems support various types of projects including marketing projects, design projects, manufacturing projects, consulting projects, development projects, and any combination thereof. Project development systems usually can include project development applications that run on computing devices for managing one or more projects.

Project development systems often use a project structure to describe a given project. In general, a project structure maps real-world aspects of a project, such as deadlines and tasks, into an electronically accessible format. For example, many project development systems describe a start, finish, and other schedule dates of a project, the tasks that are performed and the results that are achieved during the project, and the data objects that are generated by the project or used to complete the project.

SUMMARY

The present invention provides methods and apparatus, including computer program products, for dynamically and graphically representing a process.

In general, in one aspect, a computer-based method for representing a project includes accessing a description of the project, generating a graphic display of the project based on the description, and dynamically updating the graphic display in response to a change in the description of the project.

Implementations of this or any other aspect can include one or more of the following features. The graphic display can be dynamically updated to indicate progress in the project such as, e.g., progress in an element of the project. Generating the graphic display can include displaying relative progress of the project relative to, but independently of, an expectation of progress and displaying a relative rate of progress of the project relative to, but independently of, an expectation of a rate of progress.

The relative progress and the relative rate of progress can be displayed using an indicium. The indicium can generally resemble an arrow. The indicium can have an orientation and a scalable visual characteristic. Displaying the relative progress can include displaying the indicium with the scalable visual characteristic in accordance with the relative progress. Displaying the relative rate of progress can include displaying the indicium with the orientation in accordance with the relative rate of progress. The indicium can be framed in a gauge to assist a user in determining one of the relative progress or the relative rate of progress. The gauge can include marks that subdivide a range of a characteristic of the indicium.

A perspective representation of the project can be displayed. The perspective representation can include, e.g., an indication of an approach to an end of the project, a current time along the project, a decision date along the project, or an element of the project. The element can be marked. The perspective representation can generally resemble a path extending into a horizon.

In general, in another aspect, a computer program product for representing a project includes instructions that cause a processor to convert a description of the project into display instructions for displaying relative progress of the project relative to, but independently of, an expectation of progress and displaying a relative rate of progress of the project relative to, but independently of, an expectation of a rate of progress. The computer program product can be tangibly stored on machine readable media.

Implementations of this or any other aspect can include one or more of the following features. The instructions can also cause the processor to convert the description of the project into display instructions for displaying the indicium with an orientation and a scalable visual characteristic. The scalable visual characteristic can be displayed in accordance with the relative progress of the project, and the orientation can be displayed in accordance with the relative rate of progress of the project. The indicium can be framed in a gauge to assist a user in determining one of the relative progress and the relative rate of progress, and a range of an attribute of the indicium can be subdivided with marks to assist the user in determining an attribute of the indicium.

The instructions can also cause the processor to convert the description of the project into display instructions for displaying a perspective representation of the project. The perspective representation can include one or more of an indication of an approach to an end of the project, an indicator of a current position, and an element in the project. The perspective representation can generally resemble a path.

In general, in another aspect, a computer program product for representing a project includes instructions that cause a processor to convert a description of the project into display instructions for displaying relative progress of the project using an indicium, displaying a relative rate of progress of the project in the indicium, and framing the indicium in a gauge to assist a user in determining one of the relative progress and the relative rate of progress. The computer program product can be tangibly stored on machine readable media.

Implementations of this or any other aspect can include one or more of the following features. The instructions can also cause the processor to convert the description of the project into display instructions for subdividing a range of an attribute of the indicium with marks to assist the user in determining an attribute of the indicium. The attribute can be the orientation of the indicium or the relative rate of progress of the project displayed by the indicium. The relative progress of the project can be displayed relative to, but independently of, an expectation of progress. The relative rate of progress of the project can be displayed relative to, but independently of, an expectation of a rate of progress. The instructions can also cause the processor to convert the description of the project into display instructions for displaying a perspective representation of the project.

Implementations of the invention can provide one or more of the following advantages. When a project development system dynamically and graphically represents a project, a manager or other user is able to oversee the project more effectively. In particular, many projects can be complex. For example, projects can involve several different participants working in several different departments using several different technologies. A project manager may lack the expertise, the information, or the time needed to sort through progress reports, documentation, and milestone realization information from the different aspects of the project. A dynamic and graphical representation of the project highlights changes in the project, such as the completion of tasks and milestones, to a manager.

By displaying the relative progress and the relative rate of progress independently of an expectation metric, the space on a display vacated by an expectation metric can be devoted to other purposes and more compressed displays result. Moreover, since human users are adept at processing visual information presented in perspective, perspective representations of the project can readily convey project information to a human user.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2 shows a representation of a project.

FIGS. 3-5 show indicia for independently representing a project.

Like reference symbols in the various drawings indicate like elements.

DETAILED DESCRIPTION

Figure 1:
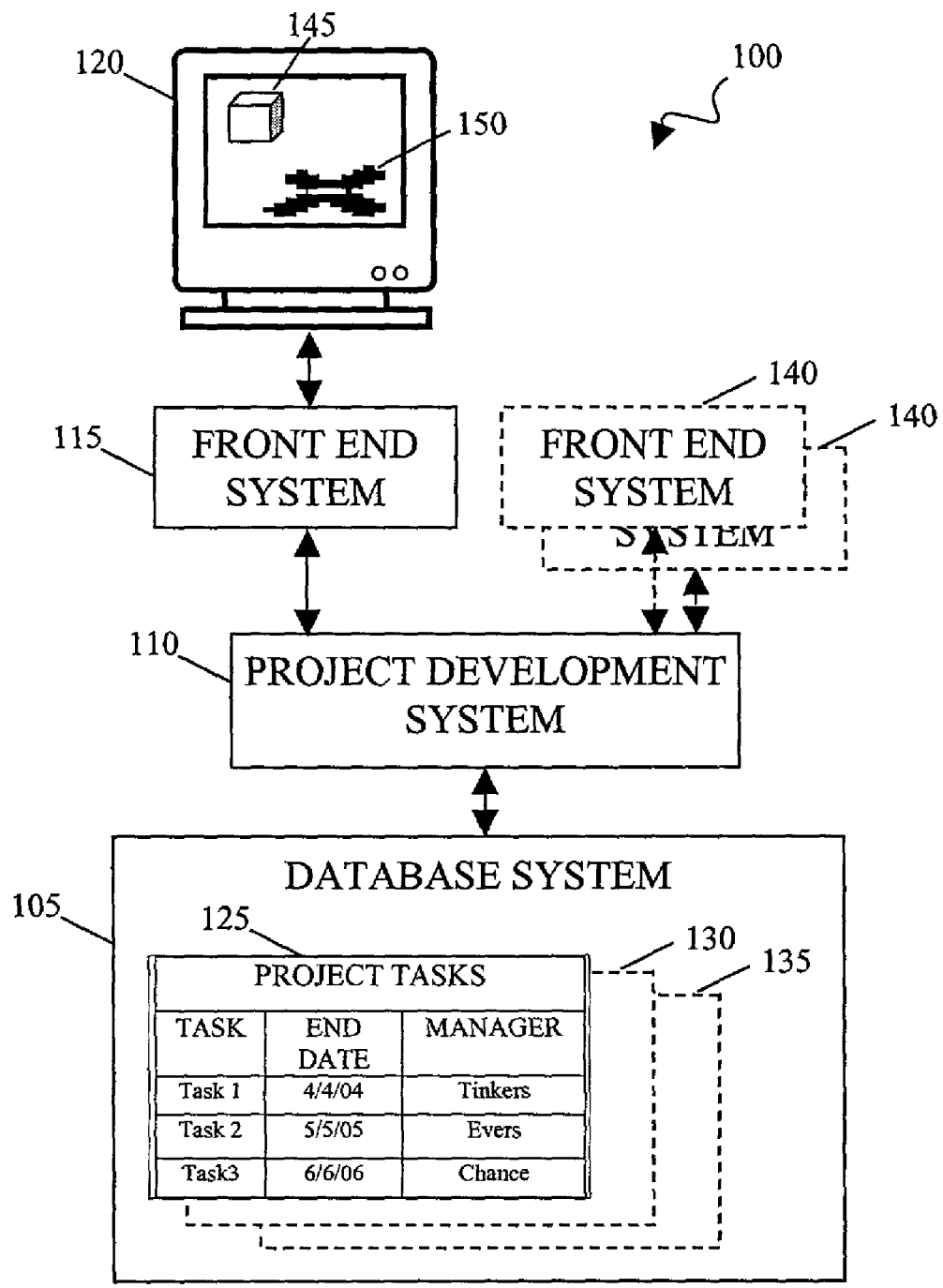
FIG. 1 shows a system for graphically and dynamically representing projects

As shown in FIG. 1, a system 100 in accordance with the invention for representing projects includes a database system 105, a project development system 110, a front end system 115, and a graphical output device such as a monitor 120. Database system 105 stores a collection of objects 125, 130, 135 or other data that describe a project. Project development system 110 is an application that stores and executes a project development application. Project development system 110 accesses objects 125, 130, 135 while executing the project development application to develop and manage the project. Front end system 115 communicates with project development system 110 during execution of the project development application. For example, front end system 115 can receive information and instructions for dynamically and graphically representing the project on monitor 120.

System 100 can be part of project development system 110 and can also include one or more additional front end systems 140 that communicate with project development system 110 during execution of the project development application. For example, front end systems 140 can provide information to project development system 110 that updates the status of the project as, e.g., tasks are completed and milestones reached. Project development system 110 incorporates this information into objects 125, 130, 135. The description of the project at database system 105 thus dynamically changes in time, and the changes are dynamically and graphically displayed for a user by front end system 115 on monitor 120.

In particular, the representation of the project on monitor 120 can include a graphical representation of the structure of the project 145 and a graphical representation of the status and progress of the project 150. The structure of the project 145 and the status and progress of the project 150 can be represented, e.g., in one or more iconic devices that may not include text information. The one or more iconic devices can change dynamically, for example, in real time, to represent the changes in the description of the project stored at database system 105. By dynamically and graphically representing the project, system 100 highlights the changes in the project description to a user such as a project manager.

For example, as shown in FIG. 2, a project can be represented using a Cartesian representation 200. Representation 200 includes an x-axis 205 and a y-axis 210 that cross at an origin 215. X-axis 205 represents time in the project and y-axis 210 represents progress of the project. The project can start at origin 215 and be projected to end at an end point 220. End point 220 is a time T after the start time at origin 215 and has advanced a progress P after the starting circumstance at origin 215.

The course of the project can be indicated along a path 225 within representation 200. Path 225 extends from the project start at origin 215 to project end point 220 and maps the real world project into representation 200. In particular, for each point in time (i.e., for each point along the x-axis), path 225 maps the absolute progress of the project and the rate of progress in the project. The absolute progress of the project is provided by the vertical position of path 225 for each point in time. The rate of progress is provided by the slope of path 225 for each point in time. Path 225 can dynamically change as the project progresses.

Representation 200 can also include metric paths 230, 235. Metric paths 230, 235 are standard expectations used to estimate the course of the project along path 225. For example, metric path 230 represents the course of a project that is expected to progress linearly from starting at origin 215 to end point 220. Metric path 235 represents the course of a project that is expected to progress at different rates between origin 215 and end point 220. The course of metric path 235 can be determined from, e.g., estimates or historical records of the time needed to complete different portions of the course of the project.

The relative progress of a project can be determined by comparing the position of path 225 to a selected metric path 230, 235. In one example, when path 225 is above the selected metric path 230, 235 at a point in time (such as, e.g., a point 240), the project has progressed farther than expected. In another example, when path 225 is below the selected metric path 230, 235 at a point in time (such as, e.g. a point 245), the project has not progressed as far as expected.

The relative rate of progress of a project can be determined by comparing the slope of path 225 to the slope of the selected metric path 230, 235. When the slope of path 225 is greater than the slope of the selected metric path 230, 235 at a point in time (such as, e.g. a point 250), the project is progressing faster than expected. When the slope path 225 is less than the slope of the selected metric path 230, 235 at a point in time (such as, e.g. a point 255), the project is progressing slower than expected.

As shown in FIGS. 3-6, the course of a project including the relative progress of the project and the relative rate of progress of the project can be dynamically represented using an indicium 300. Indicium 300 can be, e.g., an alphanumeric character, a cipher, or another graphic device. In one particular implementation, indicium 300 is an arrow.

Indicium 300 has both an orientation 305 and a visual characteristic 310. Orientation 305 of indicium 300 independently indicates the relative rate of progress of the project at a particular time. In other words, orientation 305 does not require a scale to indicate the relative rate of progress to a user.

Visual characteristic 310 independently indicates the relative progress of the project at a particular time. In other words, visual characteristic 310 does not require a scale to indicate relative progress. Visual characteristic 310 can be, e.g., a color of indicium 300, a pixel density of indicium 300, or any other visually identifiable characteristic of indicium 300 that can indicate a scale. In one particular implementation, visual characteristic 310 is green to indicate that the project has progressed relatively farther than expected, visual characteristic 310 is yellow to indicate that the project has progressed in accordance with expectations, and visual characteristic 310 is red to indicate that the project has not progressed relatively as far as expected at a particular time.

By displaying the relative progress and the relative rate of progress independently of an expectation metric, the space on a display vacated by the expectation metric can be devoted to other purposes and more compressed displays result. Moreover, both orientation 305 and visual characteristic 310 of indicium 300 can dynamically represent changes in the project. For example, indicium 300 can reorient and change color. By dynamically representing the project, indicium 300 highlights changes in the project to a user such as a project manager.

Figure 6:
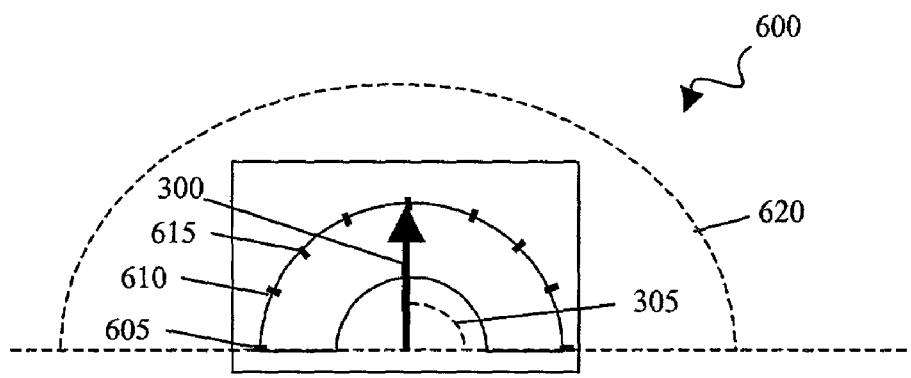
FIG. 6 shows an indicium framed in a gauge.

As shown in FIG. 6, indicium 300 can be framed in a gauge 600 that helps a user to determine orientation 305 of indicium 300. Gauge 400 includes marks 605, 610, 615 that subdivide a range 620 of potential orientations of indicium 300 so that a user might easily determine orientation 305. Gauge 600 can generally resemble a speedometer.

Figure 7:
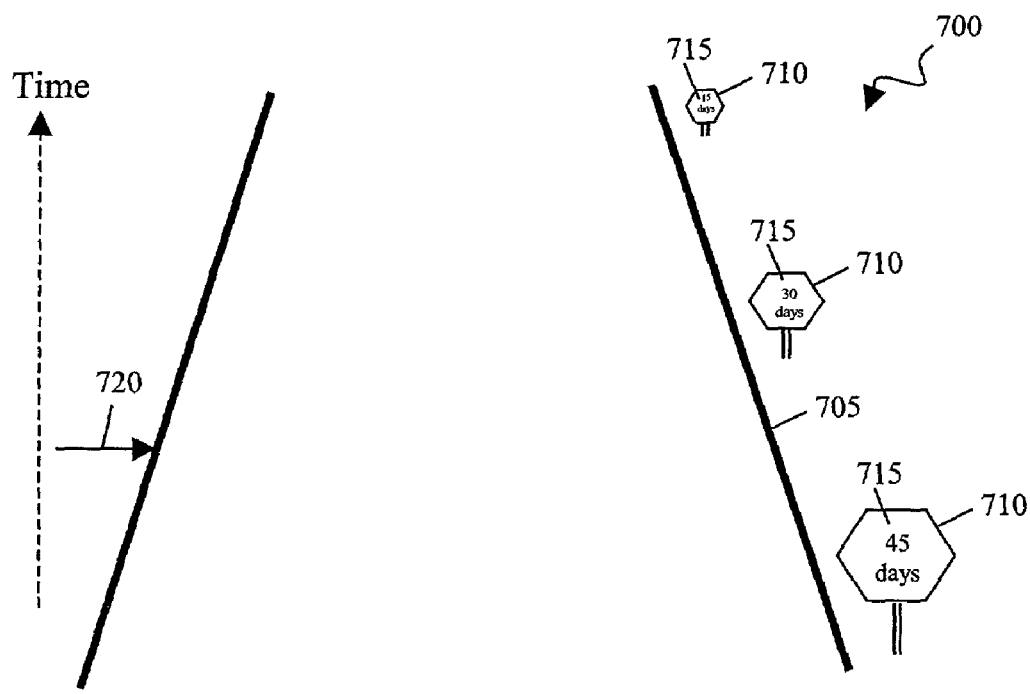
FIGS. 7-9 show perspective representations of a project.

As shown in FIG. 7, the course of a project can also be dynamically represented using a perspective representation 700. In one example, perspective representation 700 includes a path representation 705 that extends into the horizon of a display and is bounded by a collection of end markers 710. Using alphanumeric characters 715, end markers 710 mark the approach of path representation 705 to the end of the project. End markers 710 can mark, e.g., the remaining time allotted to the project. The current time along path representation 705 can be indicated by a present day indicator 720. Present day indicator 720 can generally resemble, for example, an arrow.

Since human users are adept at processing visual information presented in perspective, perspective representation 700 can readily convey information about the end of a project to a user.

Figure 8:
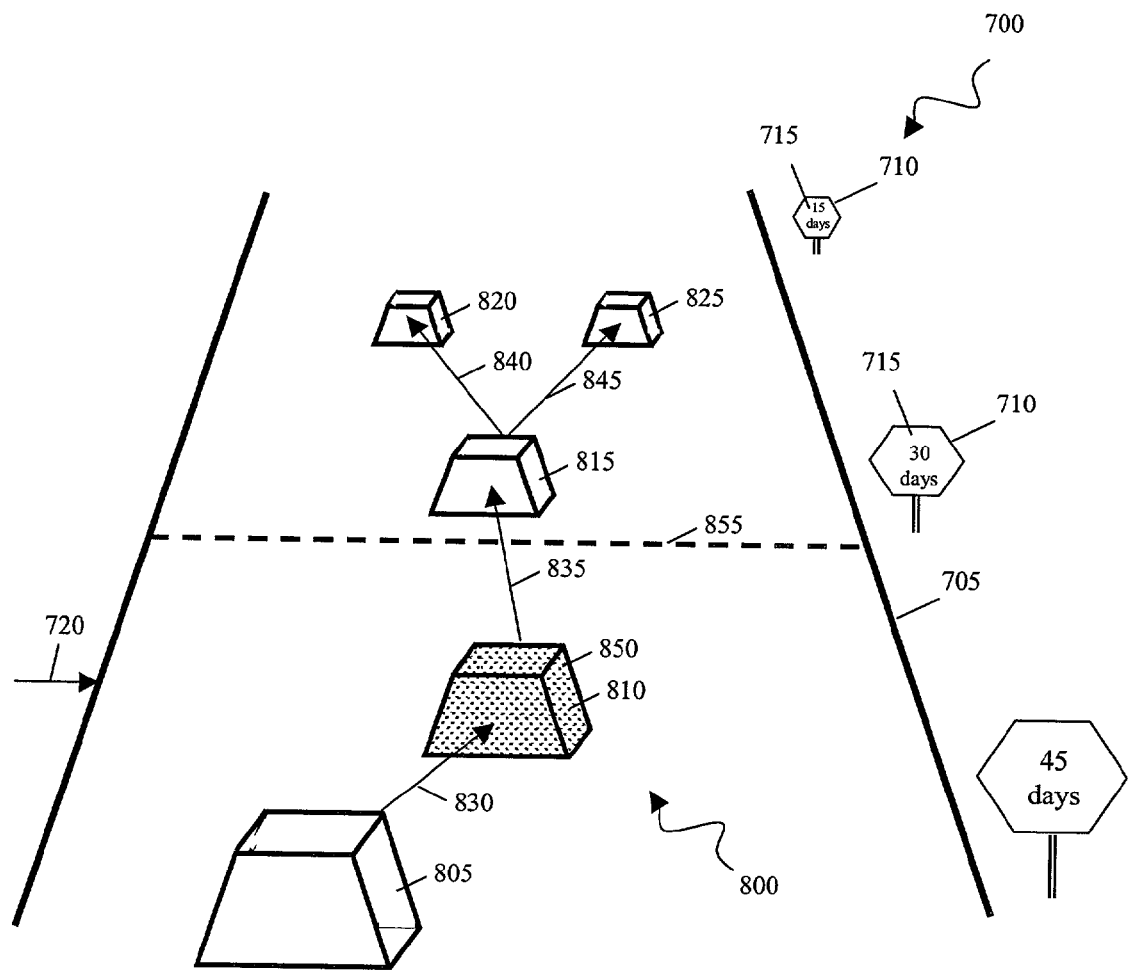

As shown in FIG. 8, perspective representation 700 can include an element series 800 that can also be represented in perspective. Element series 800 includes a collection of project elements 805, 810, 815, 820, 825 that are linked by a collection of linkages 830, 835, 840, 845. Project elements 805, 810, 815, 820, 825 represent subunits of the project such as specific tasks or milestones along the path of the project and along path representation 705.

Linkages 830, 835, 840, 845 indicate relationships between project elements 805, 810, 815, 820, 825. For example, linkages can indicate dependencies between project elements 805, 810, 815, 820, 825, such as when one project element must be completed before work on another project element can begin or when information or material from one project element flows to the next project element. Linkages 830, 835, 840, 845 can, e.g., generally resemble arrows to indicate dependencies.

Project elements 805, 810, 815, 820, 825 can be marked to indicate a characteristic of the project element. As shown, project element 810 is marked by pixelation 850 to indicate, along with present day indicator 720, that project element 810 is the current project element. Other markers can indicate, e.g., the criticality of a project element, the percent completion of the project element, who is responsible for a project element, or who is interested in a project element. Markers such as pixelation 850 can also dynamically represent changes in the individual elements of the project. For example, pixelation 850 can become progressively denser as project element 810 approaches completion. By dynamically changing, markers such as pixelation 850 highlight the changes in the individual elements of the project to a user.

Perspective representation 700 can also include a significant date indicator 855. Date indicator 855 can indicate, e.g., the date on which a decision will be made, such as whether or not to proceed to the end of the project. If a user selects date indicator 855 by, e.g., clicking on date indicator 855 using a mouse, then a window describing the significance of the date (such as, e.g., who is the decision maker, the exact date, and decision criteria) pops up. Date indicator 855 can, e.g., generally resemble a broken line boundary across path representation 705.

Figure 9:
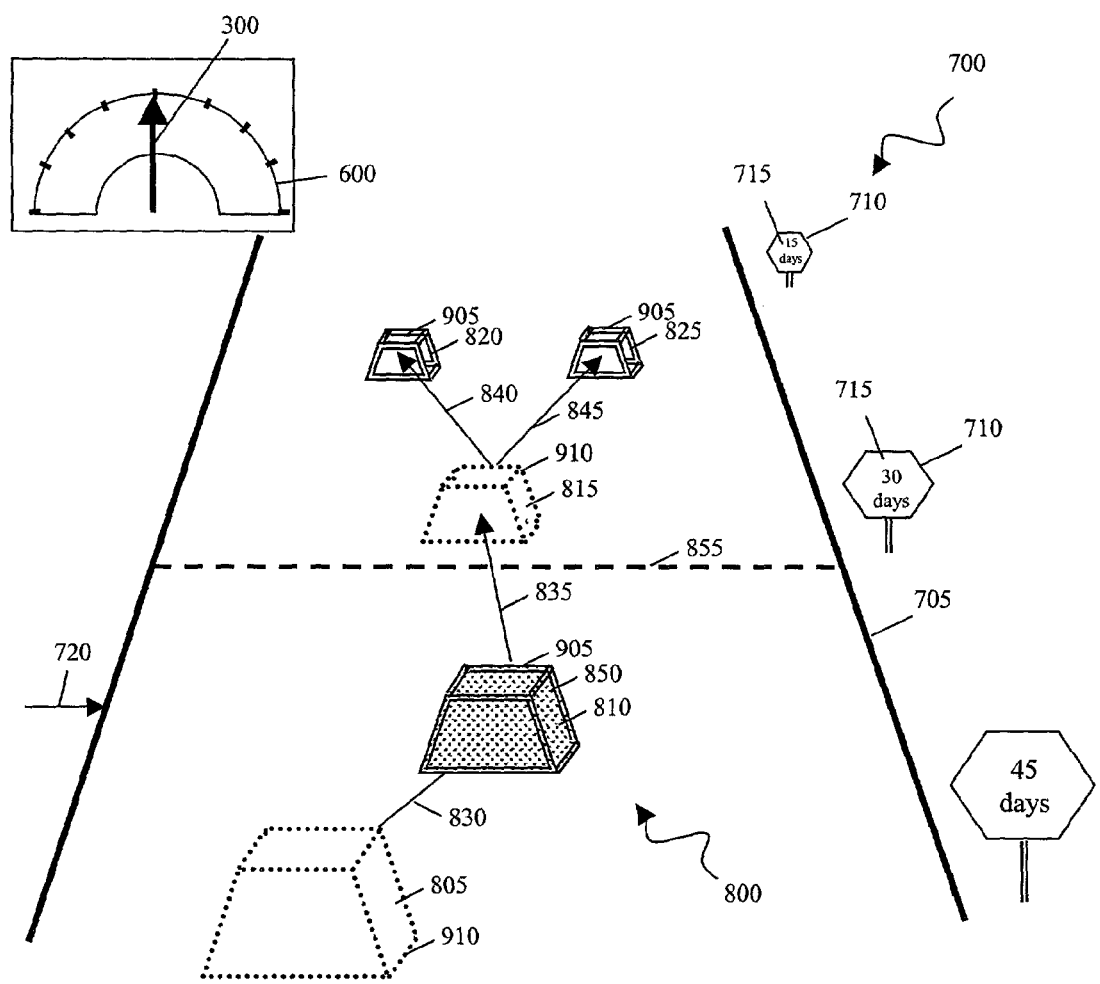

As shown in FIG. 9, perspective representation 700 can also include gauge 600 framing indicium 300. Gauge 600 and indicium 300 can be positioned adjacent path representation 705. If a user selects a particular project element 805, 810, 815, 820, or 825, a second gauge 600 and indicium 300 that describe progress within the selected project element can pop up adjacent to, within, or at a specified location relative to the indicated element.

Also as shown in FIG. 9, perspective representation 700 can also include provide a role-based view of the course of a project. In particular, the project elements to which a user contributes, such as, e.g., project elements 810, 820, and 825, can include a highlight marker 905 to indicate that the user is involved with, interested in, or responsible for these elements. Likewise, project elements to which a user does not contribute, such as, e.g., project elements 805 and 815, can include a dashed line marker 910 to indicate that the user is not involved with these elements. Other markers can indicate, e.g., that the user is responsible for management of the project element, or can identify one or more individuals who contribute to the project element.

Figure 10:
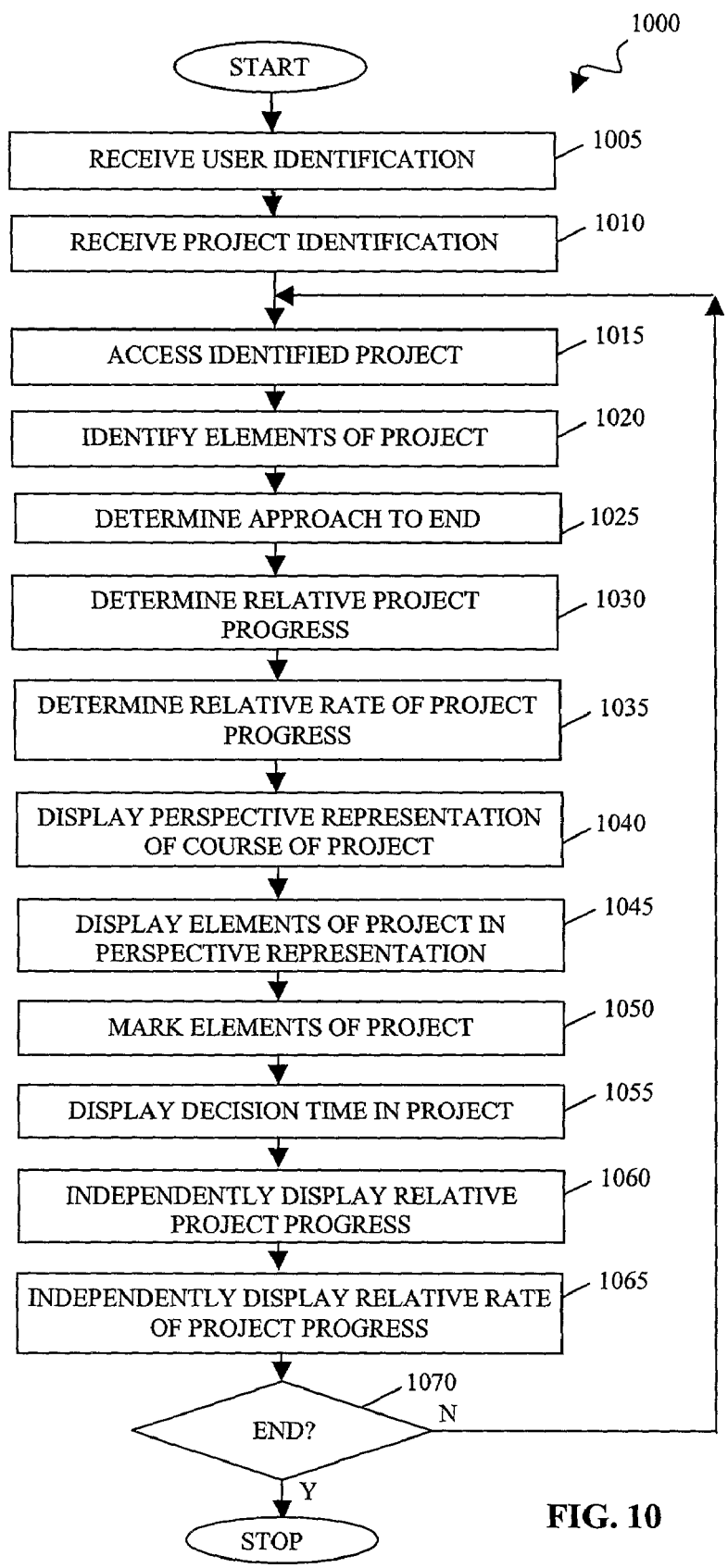
FIG. 10 shows a method for representing a project.

As shown in FIG. 10, a system for graphically and dynamically representing the course of a project can perform a method 1000 to, e.g., create the described representations. The system for representing the course of a project first receives an identification of the user for whom the project is to be represented (step 1005) and an identification of one or more projects in which the user is interested (step 1010). The user identification can be, for example, a login name or a password.

The system then accesses a project structure that relates to the identified project (step 1015). The project structure can include information, in an electronically accessible format, about the a start, finish, decision dates, and other schedule dates of a project, the tasks that are performed and the results and milestones that are to be achieved during the project, and the data objects that are generated by the project or used to complete the project. The system identifies elements of the project from the project structure (step 1020). The elements can be, for example, the component tasks of the project or the milestones that are to be achieved during the course of the project.

The system also determines the approach to the end of the project (step 1025). For example, the system can compare the current date with the finish date of the project from the accessed project structure to determine the time remaining in the project. The system can also determine the portion of the project elements have been completed to identify appropriate scaling for a representation of the course of the project.

The system also determines the relative progress of the project and/or individual element within the project (step 1030) by comparing the progress of the project with the expected progress. For example, the project elements that have been completed can be compared with a metric that describes an expected element completion.

The system also determines the relative rate of progress of the project and/or individual element within the project (step 1035) by comparing the rate of progress of the project with the expected rate of progress. For example, the rate of completion of project elements can be compared with the expected rate of completion of project elements in a project metric. The rates can be smoothed by, e.g., averaging the rates over a suitable period of time to minimize the effects of element discretization.

The system can display the course of the project using a perspective representation of the course of the project (step 1040). The perspective representation of the course of the project can generally resemble perspective representation 700 and can include one or more graphical devices that indicate the approach to the end of the project and the current position along the course of the project. The approach to the end and the current position can be given in time.

The system can also display some or all of the identified elements of the project in the perspective representation of the course of the project (step 1045). The identified element display can generally resemble element series 800, and can include linkages between the elements to indicate dependency. The system can then mark some or all of the elements in the perspective representation (step 1050). Elements can be marked to indicate the elements associated with or managed by the user who is identified by the received user identification. Elements can also be marked to indicate whether an element is the current element, the state of completion of the element, the criticality of the element, or that the user is not associated with an element.

The system can also display a date indicator along the course of the project (step 1055). When the system receives a user selection identifying the displayed date indicator, the system can provide additional information about the date such as, e.g., the person responsible for making a decision on that date, the date of the decision, and the criteria upon which the decision will be based.

The system can also display the relative progress of a project independently of the metric used to determine the relative progress (step 1060), and the relative rate of progress of a project independently of the metric used to determine the relative rate of progress (step 1065). Both the relative progress and the relative rate of progress can be displayed in a single indicium, such as indicium 300. The indicium can be framed in a gauge in the display to aid a user in determining the relative orientation of the indicium.

The system also determines if it has received an indication that dynamic representation of the project is no longer desired (decision 1070). The indication can be received, e.g., from a project manager or other user. If the representation is to continue, the system again accesses the project structure to update the displays created in steps 1040 through 1065 with any changes.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs ("application-specific integrated circuits").

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of implementations of the invention have been described. Nevertheless, it will be understood that various modifications may be made without departing from the spirit and scope of the invention. For example, the methods and apparatus described herein can be used for dynamically and graphically representing projects.

Accordingly, other implementations are within the scope of the following claims.

What is claimed is:

1. A method for representing a project, the method implemented by a system including at least one programmable processor and comprising:

accessing, a description of the project, wherein the description of the project includes information, in an electronically accessible format, about an actual rate of progress and an expected rate of progress of at least a portion of the project;

comparing, by the system, the actual rate of progress and the expected rate of progress of at least a portion of the project and thereby determining a relative rate of progress of at least the portion of the project;

generating, by the system, a graphic display on a display device, the graphic display indicating the determined relative rate of progress of at least the portion of the project; and dynamically updating, by the system, the relative rate of progress indicated on the graphic display on the display device in response to a change in the description of the project.

2. The method of claim 1, further comprising dynamically updating, by the system, the graphic display on the display device to indicate progress in the project.

3. The method of claim 2, wherein dynamically updating the graphic display to indicate progress in the project comprises updating a graphic representation of an element in the project to indicate progress in the element of the project.

4. The method of claim 1, wherein:

generating the graphic display comprises displaying relative progress of the project relative to, but independently of, an expectation of progress on the graphic display; and the relative rate of progress of at least the portion of the project is graphically displayed on the graphic display relative to, but independently of, an expectation of a rate of progress.

5. The method of claim 4, wherein the relative progress and the relative rate of progress are displayed on the graphic display using a single indicium.

6. The method of claim 5, wherein the single indicium comprises an arrow indicium that generally resembles an arrow.

7. The method of claim 5, wherein the single indicium comprises:
   a scalable visual characteristic that is displayed on the graphic display in accordance with the relative progress; and
   an orientation that is displayed on the graphic display in accordance with the relative rate of progress.

8. The method of claim 5, further comprising framing, by the system, the single indicium in a gauge to assist a user in determining at least one of the relative progress and the relative rate of progress.

9. The method of claim 8, wherein the gauge comprises marks that subdivide a range of an attribute of the single indicium.

10. The method of claim 5, further comprising framing, by the system, the indicium in a gauge to assist a user in determining at least one of the relative progress and the relative rate of progress.

11. The method of claim 10, further comprising subdividing, by the system, a range of an attribute of the indicium with marks to assist the user in determining an attribute of the indicium.

12. The method of claim 1, further comprising displaying, by the system, a perspective representation of the project on the display device.

13. The method of claim 12, wherein the perspective representation of the project comprises an indication of an approach to an end of the project.

14. The method of claim 12, wherein the perspective representation of the project comprises an indicator of a current position in the project.

15. The method of claim 12, wherein the perspective representation of the project comprises a path perspective representation that generally resembles a path.

16. A computer program product, tangibly stored on one or more machine readable media, for representing a project, the product comprising instructions that cause a programmable system including at least one programmable processor to convert a description of the project into display instructions for performing operations, the operations comprising:
   accessing a description of the project, wherein the description of the project includes information, in an electronically accessible format, about an actual rate of progress and an expected rate of progress of at least a portion of the project;
   comparing an actual rate of progress and an expected rate of progress of at least a portion of the project and thereby determining a relative rate of progress of at least the portion of the project;
   generating a graphic display on a display device, the graphic display indicating the determined relative rate of progress of at least the portion of the project; and
   dynamically updating the relative rate of progress indicated on graphic display on the display device in response to a change in the description of the project.

17. The computer program product of claim 16, wherein:
   generating the graphic display comprises displaying relative progress of the project relative to, but independently of, an expectation of progress; and
   the relative rate of progress of at least the portion of the project is graphically displayed relative to, but independently of, an expectation of a rate of progress.

18. The computer program product of claim 17, wherein the relative progress and the relative rate of progress are displayed using a single indicium.

19. The computer program product of claim 18, wherein the single indicium comprises:
   a scalable visual characteristic that is displayed in accordance with the relative progress; and
   an orientation that is displayed in accordance with the relative rate of progress.

\* \* \* \* \*